United States Patent [19]

Junio

[11] 4,333,115
[45] Jun. 1, 1982

[54] TAPE TRANSPORT CONTROL SYSTEM

[75] Inventor: David L. Junio, Littleton, Colo.

[73] Assignee: Honeywell Inc., Minneapolis, Minn.

[21] Appl. No.: 104,681

[22] Filed: Dec. 14, 1979

[51] Int. Cl.³ .................. G11B 19/06; G11B 27/16; G11B 15/54

[52] U.S. Cl. .................. 360/74.2; 242/186; 360/72.3

[58] Field of Search ............... 360/74.2, 72.3, 74.1, 360/73, 4; 179/100.1 DR, 100.1 PS; 318/6–7; 242/184, 186, 191, 75.51, 75.52

[56] References Cited

U.S. PATENT DOCUMENTS

| | | |
|---|---|---|
| 3,564,219 | 2/1971 | Mutziger . |
| 3,659,081 | 5/1971 | Piccione . |
| 3,702,382 | 11/1972 | Breikss . |
| 3,834,648 | 9/1974 | Rose, Jr. et al. .............. 242/186 |
| 3,849,661 | 11/1974 | Beiter . |
| 3,933,794 | 1/1976 | Iwako . |
| 3,953,713 | 4/1976 | Light . |
| 3,984,868 | 10/1976 | Ragle et al. .................. 360/73 |
| 4,172,231 | 10/1979 | d'Alayed de Costemore d'Arc et al. ................................ 360/72.3 |
| 4,177,488 | 12/1979 | Sakai ........................ 360/72.3 |
| 4,195,319 | 3/1980 | Ida .......................... 360/72.1 |
| 4,197,561 | 4/1980 | McMullen et al. .............. 360/4 |
| 4,210,940 | 7/1980 | Prysby et al. ............ 179/100.1 PS |
| 4,213,583 | 7/1980 | Mitani et al. ................. 242/186 |
| 4,215,378 | 7/1980 | Sato et al. .................... 360/74.2 |

FOREIGN PATENT DOCUMENTS

2907202 8/1979 Fed. Rep. of Germany ..... 360/74.2

*Primary Examiner*—Alfred H. Eddleman
*Attorney, Agent, or Firm*—Laurence J. Marhoefer; Lockwood D. Burton; Mitchell J. Halista

[57] ABSTRACT

A tape transport control system for monitoring the amount of tape on a tape reel using a first transducer means to provide a signal representative of the rotational speed of the tape reel. A fixed frequency oscillator is arranged to provide signals to be counted by a programmable variable modulo counter. The counter is programmed to start a countdown at a count preset by a digital word applied from a speed control selector for the tape transport. An output signal from the counter indicative of a fully decremented count status is applied to a two input AND gate which has as a second input signal an output signal from the reel transducer. An output signal from the AND gate is applied to the speed control selector to produce an interruption of an energizing signal to a capstan motor drive. In a reel-to-reel tape transport system, the control by the tape reel sensing circuit is switched from a transducer monitoring one reel to a transducer monitoring the other reel by a mode control selector whereby a transducer sensing the operation of a tape supply reel is used to control the operation of the AND gate.

15 Claims, 1 Drawing Figure

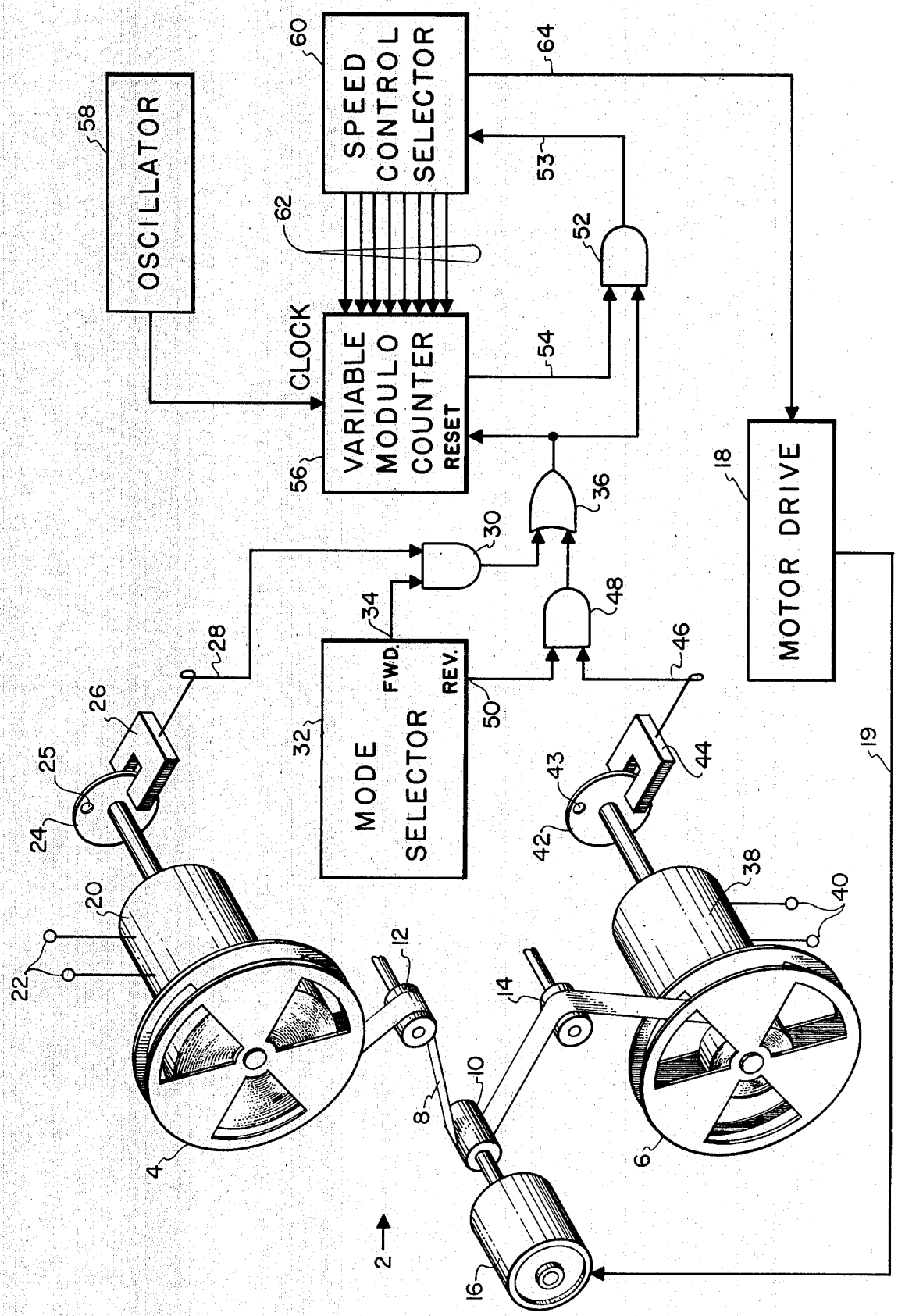

TAPE TRANSPORT CONTROL SYSTEM

BACKGROUND OF THE INVENTION

1. Field of the Invention

The present invention relates to tape recorders. More specifically, the present invention is directed to a end-of-tape control system for tape recorders.

2. Description of the Prior Art

The need for sensing end-of-tape in tape recorders has long been recognized to prevent the tape from being fully unwound from a reel, and many prior art devices have been developed to accomplish this function. The earliest devices used a "feeler" arm to detect the amount of tape remaining on a reel, e.g., U.S. Pat. No. 3,609,777. The use of such mechanical arms, however, was not always satisfactory inasmuch as damage to the tape often resulted, and the arm presented mechanical problems in operating the tape transport. Later developments were directed to the use of optical sensors, e.g., U.S. Pat. No. 3,249,758. Such optical sensors, however, exhibited a new set of problems which included sensitivity to an ambient light, higher expense and unstable control over long periods of time. A recent development has resulted in a end-of-tape sensor system for detecting end-of-tape without the use of mechanical or optical devices, e.g., U.S. Pat. No. 3,849,661. However, such a prior art control system is not directly applicable to multi-speed tape transport systems for stopping the tape at the same point regardless of the selected tape speed and uses a complicated control system which introduces additional problems of instability and reliability. Accordingly, it is desirable to provide an end-of-tape sensor for tape transports which overcomes the aforesaid objections to the prior art devices.

SUMMARY OF THE INVENTION

An object of the present invention is to provide a tape transport control system utilizing an improved end-of-tape sensor apparatus which is adaptable for multi-speed tape transport operations.

In accomplishing this and other objects, there has been provided, in accordance with the present invention, a tape transport control system for monitoring the amount of tape on a tape storage reel using a transducer means arranged to produce a signal representative of the rotational speed of a tape storage reel. A fixed frequency oscillator is counted by a programmable counter having a count operation started by a digital word supplied from a tape transport speed control to measure a time interval corresponding to a preselected tape speed. The output signal from the counter and the output signal from the transducer are applied to a signal comparator to produce an output signal indicative of a predetermined relationship between the transducer signal and the output signal from the counter. The output signal from the signal comparator is applied as a stop request signal to the tape transport drive control circuit.

BRIEF DESCRIPTION OF THE DRAWINGS

A better understanding of the present invention may be had when the following detailed description is read in connection with the single FIGURE drawing in which the single FIGURE is a block diagram of a tape transport control system embodying an example of the end-of-tape sensor of the present invention.

DETAILED DESCRIPTION

Referring to the single FIGURE drawing in more detail, there is shown a tape transport control system for controlling a tape driving apparatus 2 having a first storage reel 4 and a second storage reel 6. A tape 8 is driven between the first and second storage reels 4 and 6 by a suitable tape drive means such as capstan 10. The tape is disposed in a predetermined path between the tape reels 4 and 6 and is supported along this path by a pair of guide rollers 12 and 14 as well as the capstan 10. A capstan drive motor 16 is connected to the capstan 10 and arranged to be energized by an energizing signal applied to a capstan motor input terminal from a motor drive source 18.

The first tape reel 4 is driven by a first tape reel motor 20 having a pair of input terminals 22 arranged to be connected to a suitable source of energizing signals (not shown). One end of the motor shaft of the first reel motor 20 is connected to a code wheel 24 having a single code indicia 25 thereon. The code wheel 24 is associated with a code wheel sensor 26, and the indicia 25 on the code wheel 24 and the sensor 26 may be any suitable arrangement for sensing such indicia, e.g., optical, magnetic, etc., such devices being well-known in the art. An output signal from the sensor 26 is applied along an output line 28 to one input to a two input AND gate 30. A second input signal to the AND gate 30 is obtained from a tape transport mode selector means 32, such devices being well-known in the art. Specifically, an output signal from the tape transport mode selector means 32 representative of a desired forward motion of the tape 8 is provided from a "forward" output terminal 34 and is applied as a second input signal to the AND gate 30. An output signal from the AND gate 30 is applied as a first input signal to a two input OR gate 36.

Similarly, the second reel 6 is arranged to be driven by a second reel motor 38 connected to a pair of motor energizing signal terminals 40 and is arranged to be connected to a suitable source of energizing signal (not shown). The motor drive means 18 may be arranged to include power supply means for the reel motors 20 and 38 as well as for the capstan motor 16. These power supplies will be interconnected to the selection of the "forward" and "reverse" operating states of the tape transport by the mode selector 32. Thus, the direction of rotation of the capstan 16 and the reel motors 20 and 38 would be concurrently selected to drive the tape 8 in the desired direction. Such tape transport control devices are well-known in the art and, since the details thereof do not form a part of the present invention, the transport mode selector 32 has been described only to the extent of supplying "forward" and "reverse" output signals for application to the rest of the circuit described herein including the AND gate 30 concomitantly with the operation of the reel and capstan motors in a desired direction.

A second code wheel 42 having a single indicia 43 thereon and a second sensor 44 are operatively connected to the motor shaft with the second reel motor 38 in a manner similar to that described above for the first code wheel 24 and first sensor 26. An output signal from the second sensor 44 is applied along an output line 46 as a first input signal to a second two input AND gate 48. A second input signal for the AND gate 48 is obtained from the mode selector 32 and is representative of a selected corresponding motion of the tape 8. Specifically, an output signal from the "reverse" output terminal 50 is applied to the second input of the AND gate 48. An output signal from the AND gate 48 is, also, applied as a second input to the OR gate 36. An output signal from the OR gate 36 is applied as one input to a two input AND gate 52. A second input signal for the AND gate 52 is applied along an input line 54 from a zero count stage output of a variable modulo counter 56. This zero count stage output signal from the counter 56 is indicative of the attainment of a predetermined count level. Specifically, the counter output signal represents the attainment of a zero count obtained by counting down, i.e., decrementing, the counter 36 from a predetermined count level. The countdown operation of the counter 56 from the preset count produces a measurement of a time interval corresponding to a tape speed since an oscillator 58 provides a fixed frequency "clock" signal which decrements the counter from the speed related preset count. The output signal from the OR gate 36 is also applied as a "reset" signal to the counter 56 to control its counting operation.

A fixed frequency oscillator 58 is arranged to provide a clock signal to be counted by the counter 56 and is connected to a "clock" input terminal on the counter 56. A speed control selector 60 arranged to control the operation of the tape transport system by selecting a desired tape speed provides a digital word corresponding to a selected tape speed over digital word bit lines 62 to the counter 56 to insert a predetermined count into the counter 56 corresponding to a preselected speed of the tape 8, i.e., the digital word presets a count into the counter 56. Concurrently, the speed control selector 60 is arranged to provide a control signal to the motor drive 18 to control the movement of the tape 8 at the desired speed, such speed controls being well-known in the art.

In operation, the output signals from either the sensor 26 or the sensor 44 are used by the control system depending on the operation of the mode selector 32. In the following example, the mode selector 32 is assumed to be in a "forward" mode state whereby an output signal from the "forward" output terminal 34 is applied to the AND gate 30. This signal is effective along with the signal on line 28 to control the output signal from the AND gate 30. At this time, the AND gate 48 is not enabled by the mode selector 32, and the output signal from the sensor 44 is blocked thereby. The output signal of the sensor 26 is arranged to produce a negative or "zero" output signal level until the single indicia 25 on the code wheel 24 is sensed by the sensor 26. This negative level signal is effective to deenergize the AND gate 30 and to maintain its output signal at a negative level or "zero" level. The aforesaid deenergization of the AND gate 48 is also effective to produce a "zero" or negative output signal level on its output line. Inasmuch as both inputs to the OR gate 36 are at a "zero" level, the output from the OR gate 36 is also retained at a negative or "zero" output level. This output signal from the OR gate 36 is, in turn, effective to deenergize the AND gate 52. At this time, the AND gate 52 produces a "zero" or negative level output signal which is applied to the speed control selector 60 as an indication that the end-of-tape condition has not been reached. The "zero" output of the OR gate 36 is also applied to the "reset" input of the counter 56 where it is ineffective to affect the counter 56.

When the indicia 25 is sensed by the sensor 26, a positive or "one" signal level is produced by the sensor 26 and is applied to the AND gate 30. This signal level in combination with the positive signal level from the "forward" output terminal 34 of the mode selector 32 is effective to produce a positive or "one" output signal from the AND gate 30. This positive output signal from the AND gate 30 is applied to the OR gate 36 to produce a positive or "one" output signal level from the OR gate 36. This positive signal level from the OR gate 36 is applied to the AND gate 52 and to the "reset" input of the counter 56 to act as a "reset" signal for the counter 56. Concurrently, the output signal from the counter 56 zero count stage, in effect, is compared by the AND gate 52 with the "one" signal from the OR gate 36. If the counter 56 has reached a zero, or fully decremented, count state from the preset count initially introduced by the speed selector 62 over digital bit word lines 62, a positive output signal is applied to the output line 54. The concurrent combination of the two positive input signals to the AND gate 52 produces a positive or "one" output signal level from the AND gate 52 which is applied to the speed control selector 60 as an indication of an end-of-tape point on the tape 8 remaining on the tape reel 4, i.e., a "stop" request signal. In response, the speed control selector 60 is arranged to stop the movement of the tape 8 by a deenergization of the motor drive 18.

If the counter 56 at this time is not in a fully decremented condition, the zero count stage output signal on the output line 54 remains as a negative or "zero" output signal and is ineffective in combination with the "one" output signal from the OR gate 36 to energize the AND gate 52 to produce a positive output signal for application to the speed control selector 60. In response, the speed control selector 60 maintains the operation of the motor drive 18 at the preselected speed to continue the forward motion of the tape 8. However, the "1" output signal from the OR gate 36 is effective to reset the counter 56 via the "reset" input terminal of the counter 56 to resume counting, or decrementing, by the counter 56 from the preset count introduced by the speed control selector 60. The counter 56 may advantageously include a digital bit storage register for storing the digital word from the speed control selector 60 during the decrementing and resetting of the counter 56. The further operation of the circuit is a repetition of the aforesaid operation with each sensing of the indicia 25 on the code wheel 24 being effective to produce a comparison operation by the AND gate 52 as described above.

If the tape 8 is being drive in a "reverse" direction as determined by the mode selector 32, the output signal from the "reverse" output terminal 50 of the mode selector 32 is a positive or "1" output signal to energize the second AND gate 48 in this operating state. Concurrently, the "forward" output signal from the selector 32 is a "zero" which is effective to deenergize the first AND gate 30. Accordingly, the further operation in the "reverse" mode of operation of the tape transport is dependent on the sensing of the indicia 43 on the code wheel 42 by the sensor 44 to produce the aforesaid operation for sensing the end-of-tape.

It should be noted that the speed control selector 60 may include a microprocessor having digital words corresponding to the various tape speeds to be applied to the counter 56 over digital bit line 62 stored in a computer memory. The readout of the computer memory is, accordingly, correlated to a selection of a desired tape speed to apply the respective digital word stored in the memory to the counter 56. Such an operation of the microprocessor is, of course, a well-known technique and further discussion thereof is believed to be unnecessary. It should be further noted that while a discrete AND gate has been provided in the illustrated example of the present invention as a signal comparator for monitoring the coincidence of the end of the time period represented by a full countdown of the counter 56 and the sensing of the indicia on the tone wheel representative of the rotational speed of a tape reel, such a monitoring operation could be performed by the microprocessor in the speed control selector 60 by applying both signals to the microprocessor which could be programmed in a well-known manner to periodically check the signals to determine whether or not the indicia signal had occurred either coincident with the time period signal or before it and to produce a transport stop operation to prevent a full unreeling of the tape from the storage reel. Since the microprocessor could perform the aforesaid checking operation at a relatively high speed, e.g., at microsecond time intervals, it is inherently capable of providing a closer monitoring operation of the relationship between the compared signals than the AND gate which is only cognizant of either a coincidence or non-coincidence therebetween. In either case, the preset count in the counter 56 is effective to determine a time period corresponding to a selected tape speed and the time of a predetermined cycle of the storage reel, e.g., a full rotation, is compared with the time period to determine whether or not the storage reel is travelling a rotational speed indicative of a minimum amount of remaining tape, i.e., an end-of-tape condition.

Accordingly, it may be seen that there has been provided, in accordance with the present invention, a tape transport control system having an improved end-of-tape sensor for multi-speed tape operation.

The embodiments of the invention in which an exclusive property or privilege is claimed are defined as follows:

1. A transport control system comprising
   a tape drive means for driving a tape at a predetermined speed,
   a tape storage reel means operatively associated with said tape drive means for supplying a tape to said tape drive means,
   a transducer means arranged to produce an output signal representative of the rotational speed of said tape storage reel means,
   speed control means for said drive means for producing an output signal representative of a predetermined time period corresponding to said predetermined speed of said drive means and
   comparator means for comparing said output signal from said transducer means with said output signal representative of said predetermined time period to produce a deenergization signal for said tape drive means upon the detection of a predetermined relationship therebetween, wherein said output signal from said transducer means is representative of a single rotation of said tape storage reel means and said comparator means compares the occurrence of said single rotation of said tape storage reel means with the occurrence of the end of said predetermined time period to produce said deenergization signal upon the detection of a concurrence therebetween and wherein said speed control means includes reset means for synchronizing the start of said predetermined time period with the start of said single rotation of said tape storage reel means.

2. A tape transport control system as set forth in claim 1 wherein said speed control means includes
   a counter means,
   a fixed frequency oscillator means arranged to supply a clock signal to be counted by said counter means and
   a speed control selector means for introducing a preset count into said counter means corresponding to a selected tape speed, said counter means producing an output signal representative of the end of said time period upon a complete countdown from said preset count.

3. A tape transport control system as set forth in claim 1 and including
   a second tape storage reel means arranged to cooperate with said first-mentioned tape storage reel means to store the tape therebetween,
   a second transducer means arranged to produce a signal representative of the rotational speed of said second tape storage reel means and
   switching means connected between said first transducer means and said second transducer means and said comparator means to selectively apply an output signal from said first and second transducer means to said comparator means.

4. A tape transport control system as set forth in claim 3 wherein said output signal from said first and second transducer means is representative of a single rotation of said first and second tape storage reel means, respectively, and said comparator means compares the occurrence of said single rotation of said first and second tape storage reel means, respectively, with the occurrence of the end of said predetermined time to produce said deenergization signal upon the detection of a concurrence therebetween and wherein said speed control means includes reset means for synchronizing the start of said time period with said single rotation of said first and second tape storage reel means in response to an output signal from said switching means.

5. A tape transport control system as set forth in claim 4 wherein said speed control means includes
   a counter means,
   a fixed frequency oscillator means arranged to supply a clock signal to be counted by said counter means and
   a speed control selection means for introducing a preset count into said counter means corresponding to a selected tape speed, said counter means being arranged to count down from said preset count to produce an output signal representative of the end of said time period upon the attainment of a zero count in said counter means.

6. A tape transport control system as set forth in claim 3 wherein said first and second transducer means each include a code wheel having code indicia thereon and arranged to be driven by a corresponding one of said first and second tape storage reel means and a sensor means for sensing a predetermined code indicia on said code wheel means to produce an output signal representative of the detection of said predetermined code indicia.

7. A tape transport control system as set forth in claim 3 wherein said comparator means includes an AND gate means having said output signal from said transducer means and said output signal representative of said predetermined time period applied to respective inputs of said AND gate means to produce an output signal upon the concurrence thereof.

8. A tape transport control system as set forth in claim 1 wherein said comparator means includes an AND gate means having said output signal from said transducer means and said output signal representative of said predetermined time period applied to respective inputs of said AND gate means to produce an output signal upon the concurrence thereof.

9. A multi-speed tape transport system comprising:
 a tape drive means for driving a tape at a selected one of a plurality of different tape speeds,
 a tape storage reel means operatively associated with said tape drive means for supplying a tape to said tape drive means,
 a transducer means associated with said tape storage reel means to produce successive output signals having a duration representative of the rotational speed of said tape storage reel means,
 speed control selector means for controlling said tape drive means to produce said selected one of the plurality of different tape speeds,
 time duration producing means responsive to said speed control selector means for producing a respective one of a succession of output signals each having a duration corresponding to a selected tape speed,
 resetting means for starting each signal from said time duration producing means at the end of each of said output signals from said transducer means and
 comparator means for comparing the duration of each of said output signals from said transducer means with the duration of a corresponding one of said output signals from said time duration producing means to produce a control signal for said speed control selector means upon the detection of a predetermined relationship therebetween.

10. A multi-speed tape transport system as set forth in claim 9 wherein said transducer means includes a code wheel means having code indicia thereon and arranged to be driven by said tape storage reel means and a sensor means for sensing a predetermined code indicia on said code wheel means to produce an output signal representative of the detection of said predetermined code indicia.

11. A multi-speed tape transport system as set forth in claim 9 wherein said speed control means includes a counter means, a fixed frequency oscillator means arranged to supply a clock signal to be counted by said counter means and
 a speed control selector means for introducing a preset count into said counter means corresponding to a selected tape speed, said counter means producing an output signal representative of the end of said time period upon a complete countdown from said preset count.

12. A multi-speed tape transport system as set forth in claim 9 wherein said output signals from said transducer means are each representative of a single rotation of said tape storage reel means and said comparator means compares the occurrence of said single rotation of said tape storage reel means with the occurrence of the end of a corresponding one of said output signals from said time duration producing means.

13. A multi-speed tape transport system as set forth in claim 12 wherein said time duration producing means includes a counter means and a fixed frequency oscillator means arranged to supply a clock signal to be counted by said counter means and said speed control selector means introduces a preset count into said counter means corresponding to a selected tape speed, said counter means produces each of said succession of output signals upon a complete countdown from a corresponding preset count and said reset means resets said counter means to a zero count.

14. A multi-speed tape system as set forth in claim 9 wherein said comparator means includes an AND gate means having said output signals from said transducer means and said output signals from said time duration producing means applied to respective inputs of said AND gate means to produce an output signal upon the concurrence thereof.

15. A multi-speed tape transport system as set forth in claim 9 and including
 a second tape storage reel means arranged to cooperate with said first-mentioned tape storage reel means to store the tape therebetween,
 a second transducer means arranged to produce a signal representative of the rotational speed of said second tape storage reel means and switching means connected between said first transducer means and
 said second transistor means and said comparator means to selectively apply an output signal from said first and second transducer means to said comparator means.

* * * * *